United States Patent
Frost et al.

(10) Patent No.: US 6,570,498 B1
(45) Date of Patent: May 27, 2003

(54) INTEGRATED ACCESS SYSTEM

(75) Inventors: Kenneth L. Frost, Greenfield, IN (US); Roger Keith Russell, Indianapolis, IN (US)

(73) Assignee: Best Access Systems, Indianapolis, IN (US)

( * ) Notice: Subject to any disclaimer, the term of this patent is extended or adjusted under 35 U.S.C. 154(b) by 0 days.

(21) Appl. No.: 09/814,919

(22) Filed: Mar. 22, 2001

Related U.S. Application Data

(60) Provisional application No. 60/191,120, filed on Mar. 22, 2000.

(51) Int. Cl.[7] .............................................. G08B 21/00
(52) U.S. Cl. ........................ 340/540; 340/5.2; 340/5.8; 340/541; 348/143
(58) Field of Search ................................ 340/540, 541, 340/542, 545, 937, 825.69, 5.1, 5.2, 5.6, 5.7, 5.83, 5.85, 5.8, 5.31; 348/14, 150, 153, 143, 156, 161

(56) References Cited

U.S. PATENT DOCUMENTS

| | | | | |
|---|---|---|---|---|
| 3,905,139 A | * | 9/1975 | Cooper | 40/64 R |
| 4,712,103 A | * | 12/1987 | Gotanda | 340/825.31 |
| 4,993,068 A | * | 2/1991 | Piosenka et al. | 380/23 |
| 5,206,684 A | * | 4/1993 | Wada et al. | 355/203 |
| 5,337,043 A | * | 8/1994 | Gokcebay | 340/825.31 |
| 5,541,585 A | * | 7/1996 | Duhame et al. | 340/825.69 |
| 5,821,983 A | * | 10/1998 | Weiss | 348/14 |
| 5,831,669 A | * | 11/1998 | Adrain | 348/143 |
| 5,903,216 A | * | 5/1999 | Sutsos et al. | 340/542 |
| 6,005,958 A | * | 12/1999 | Farmer et al. | 382/103 |
| 6,049,287 A | * | 4/2000 | Yulkowski | 340/693.12 |
| 6,049,353 A | * | 4/2000 | Gray | 348/159 |
| 6,314,364 B1 | * | 11/2001 | Nakamura | 701/200 |
| 6,400,276 B1 | * | 6/2002 | Clark | 340/640 |
| 6,411,328 B1 | * | 6/2002 | Franke et al. | 348/149 |

OTHER PUBLICATIONS

GM Series, Apartment Entry Security & Communication, Operation Manual, pp. 1–4, www.aiphone.com.
GM Series, Apartment Audio/Video Entry Security System, Installation Maunal, pp. 1–24, www.aiphone.com.

* cited by examiner

*Primary Examiner*—Benjamin C. Lee
*Assistant Examiner*—Phung T Nguyen
(74) *Attorney, Agent, or Firm*—Barnes & Thornburg

(57) ABSTRACT

An integrated access system includes an access device, a locking mechanism, a sensor, a controller, and a video device. The controller is coupled to the locking mechanism and the sensor and controls the locking mechanism in response to the access device being detected by the sensor. The video device captures images of a presenter of the access device. A housing houses the sensor and the video device.

36 Claims, 6 Drawing Sheets

INTEGRATED ACCESS SYSTEM

INTEGRATED ACCESS SYSTEM

This application claims priority to U.S. Provisional Patent Application Ser. No. 60/191,120; filed Mar. 22, 2000, and titled Integrated Access System.

BACKGROUND AND SUMMARY OF THE INVENTION

The present invention relates generally to access systems and more specifically to integration of the video in an access system.

Access systems generally include a locking mechanism and an access device to operate the locking device, for example, a key in a lock. In electronic systems, a controller is coupled to and controls the locking mechanism and responds to the access device. This access device may be a key pad, a key or a token, such as a card. In security control systems, video cameras are provided. Such a system known as BASIS is available from Best Access Systems of Indianapolis, Indiana. A security control system is illustrated in FIG. 1 as including a plurality of access sensors at each of the doors connected to a common access control panel by twisted pair wires and communicating with a central management system. The video cameras are also connected by a coaxial cable to a video switch also connected to the management system. A separate monitor may be provided. The cameras and each of the access sensors and controllers are in separate housings and displaced from each other. If the cameras are visible to provide another level of deterrence, they also identify the location of the cameras such that they can be compromised.

An integrated access system of the present invention includes an access device, a locking mechanism, a sensor, a controller coupled to the sensor and the locking mechanism and controlling the locking mechanism in response to the access device being detected by the sensor and a video device capturing images of the presenter of the access device. A housing contains at least the sensor and the video device. The controller may also be in the same housing.

The controller is coupled to the video device to coordinate the captured image and data generated when the access is presented. The data generated may include time and date. The controller also identifies and verifies the access device and the data may include the identity of the access device.

There is a storage device for the captured images and the controller coordinates a captured image in the storage device preceding the presentation of the access device by a predetermined period. The predetermined period may be a specific time period, for example, less than two seconds in a continuous storage device or may be a function of the storage device, for example, a first in, last out memory. Thus, the period may be defined by the cycle and length of the memory. The system can also include a transceiver coupled to the controller to transmit data and the coordinated image to a central location.

The housing includes a translucent panel and the video device is concealed behind the translucent panel. The translucent panel may be, for example, smoke glass or a one way mirror. The video device is preferably a camera mounted on the circuit board. The video device includes a wide angle lens. The power source may be a battery in the housing or an external source. The controller may include a wake up circuit response to a proximity detector to control the coupling of the power supply to the controller. The housing is an escutcheon of the lock mechanism and the handle of the lock mechanism extends through the escutcheon.

The integrated access system may also include an access device, locking mechanism and a video camera capturing images of the presenter of the access device and a controller coupled to the locking mechanism and the video device and controls the locking mechanism and coordinates the captured image and data generated when the access device is presented. The locking mechanism and the video device do not necessarily have to be in the same housing.

Storage is provided to store captured images. The controller selects and coordinates the captured image in the storage device preceding the presentation of the access device by a predetermined period of time for continuous storage of captured images. As previously discussed, this may be a function of the storage or a preselected period of less than two seconds. The data generated includes time and data and may also include data of the identity of the access device determined by the controller. The access device may be one of or more of a key, card with data and a code entered on a keypad coupled to the controller. A transmitter is coupled to the controller and transmits data and the coordinated image to the central location.

The integrated system may also include a locking mechanism, a video device and a housing containing the locking mechanism and the video device. This integrated system has a translucent panel in the housing and the video device is behind the translucent panel. The housing includes a escutcheon of the locking device and the handle of the locking extends through the escutcheon. A transmitter coupled to the video device transmits images to a central location.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
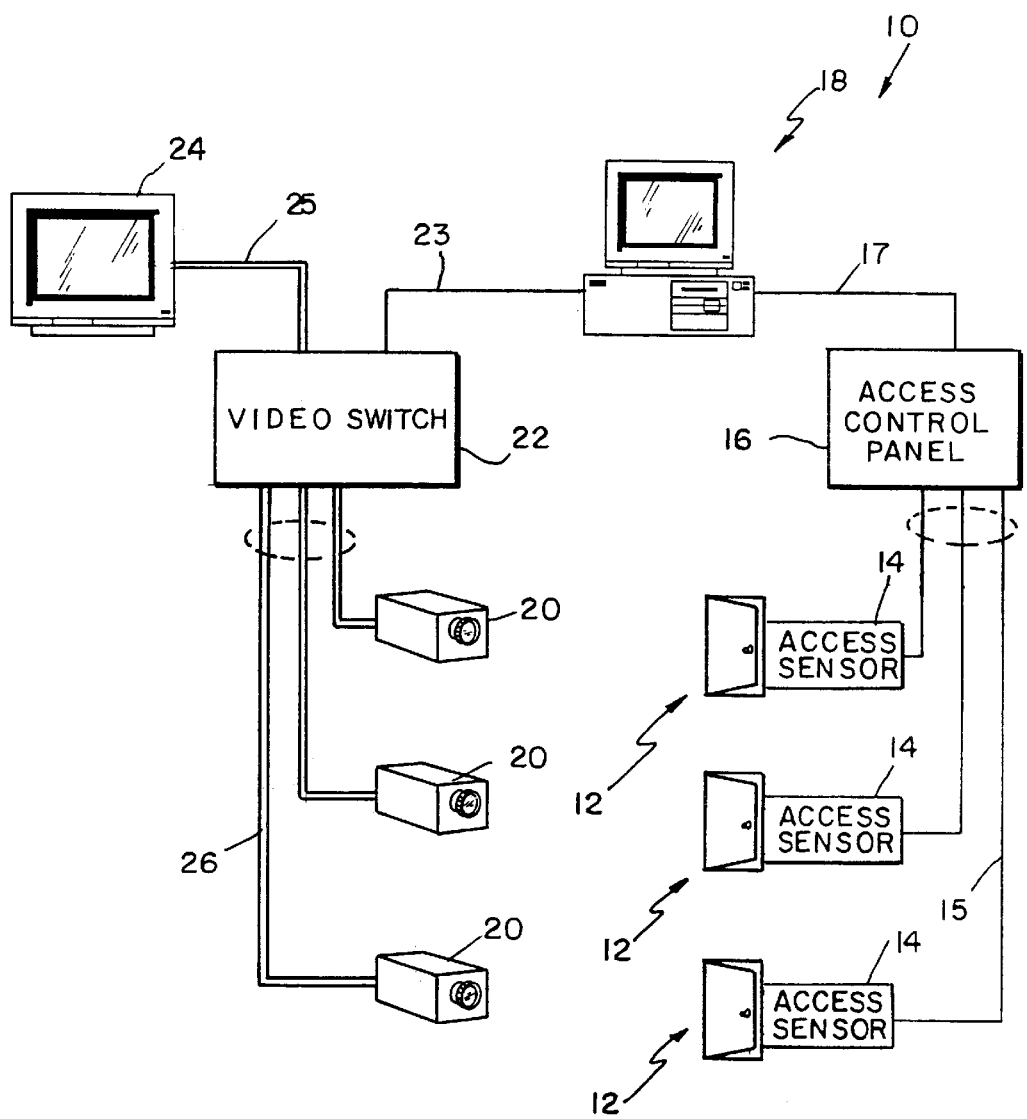
FIG. 1 is a block diagram of a security control system according to the prior art.

A prior art security control system 10 is illustrated in FIG. 1 for a plurality of entry way 12. An access sensor and locking mechanism 14 is provided next to each entry way 12. The access sensor and locking mechanism 14 are coupled to a controller which controls the locking system in response to an access device being sensed by the sensor. The access device may be a key pad, a key, or a card. The access sensor and lock mechanism 14 are connected to access control panel 16 by wire 15 which is shown as twisted pairs. The access control panel 16 is connected by cable 17 to a centralized management system 18. The security control system 10 also includes a plurality of cameras 20 each monitoring an entry way 12 and displaced from the access sensor and locking mechanism 14. Each of the cameras 20 is connected by a wire 26 shown as a coaxial cable to a video switch 22. The video switch 22 is connected through cable 23 to the management system 18. A separate and distinct video monitor 24 may also be connected by cable 25 to the video switch 22.

Figure 2:
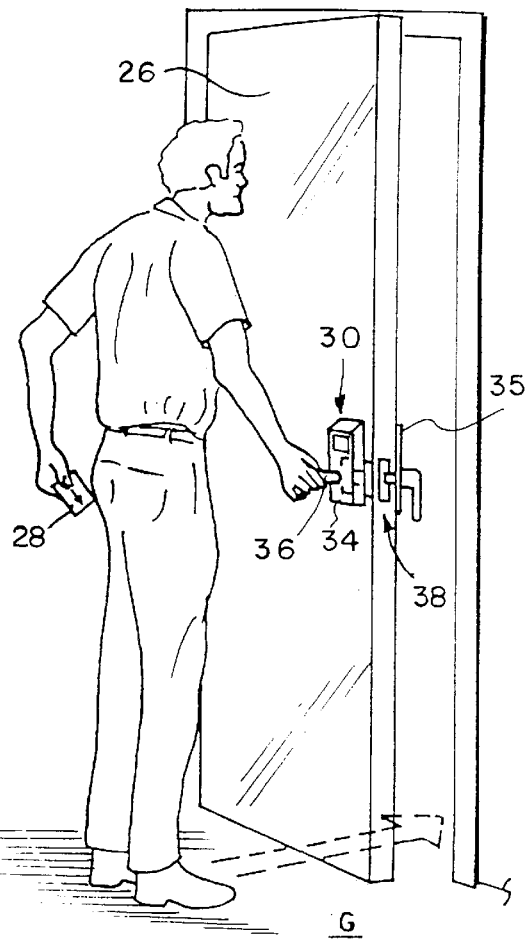
FIG. 2 is a diagramatic view of an integrated access system of the present invention and a presenter of an access device.
Figure 3:
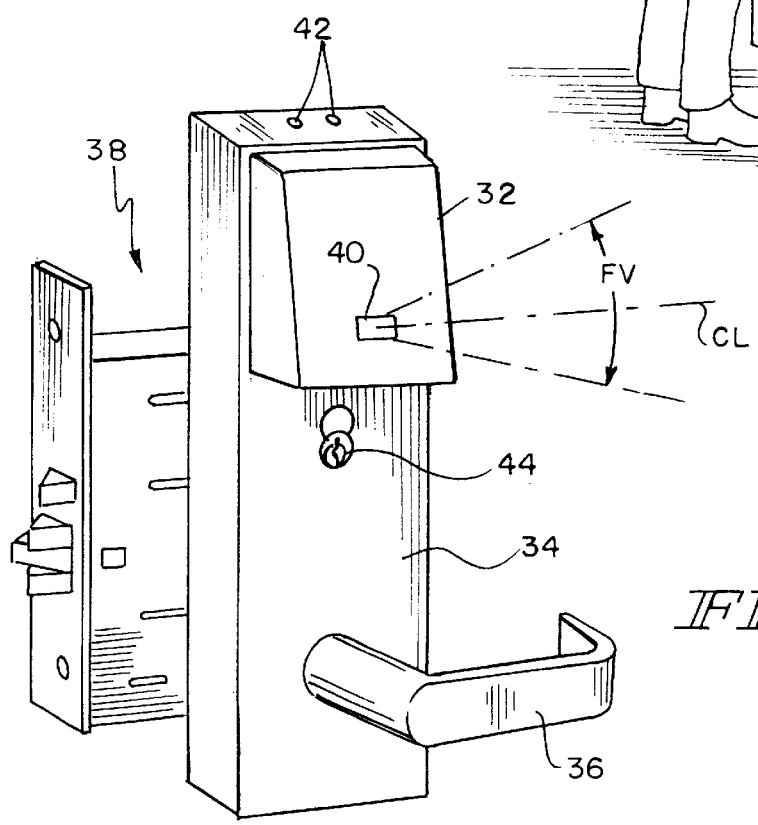
FIG. 3 is a perspective view of an embodiment of an integrated access device according to the principles of the present invention.

An integrated access system 30 including a locking mechanism, a controller and a video device is illustrated in FIGS. 2 and 3 mounted to a door 26. A bezel 32 is mounted to a front housing 34 which includes a locking mechanism, a sensor and a video device. A handle 36 of a locking mechanism 38 extends into the front housing 34 and the locking mechanism 38 in door 26. The bezel 32 includes an aperture 40 of the camera or lens of the video device. One or more indicators 42 are provided to indicate whether or not access has been allowed to the user.

A user is illustrated in FIG. 2 as holding an access device 28 which is used to actuate and unlock the lock mechanism 38. As illustrated, the access device may be a card or token. The access device 28 would be presented to the sensor which provides a signal to a controller of the access system which would identify and verify that it is an appropriate access device to unlock the locking mechanism 38. This card could include data which is magnetically or optically read. Alternatively, the access device may be a key inserted into key way 44 on the housing 34.

As illustrated in FIG. 3, the camera has a center line CL and a field of view FV. The center line CL is at an angle to the ground G so as to monitor the face of the presenter of the access device 28. The aperture 40 is generally about 40 inches from the ground G. The lens of the video system is a wide angle lens having a focal point below 18 millimeters. These generally have a field of view FV greater than 70°.

Even with this field of view, it is difficult to monitor or capture the image of the face of all presenters of the access device 28 when they are standing directly in front of the integrated access system 30. Thus, the integrated access system, as will be explained below, monitors the approach of the presenter and captures or collects the series of images. These images are correlated at the time of the presentation of the access device 28 and correlated to a previous time period so as to make sure that the face of the presenter is captured. This time period may be, for example, two seconds prior to the presentation. This is achieved by storing a series of images and selecting an image in the appropriate time period. If the visual images are continuously recorded or stored, the time of presentation is a bookmark or flag or pointer to the stored images from which a preceding stored image can be selected. Using a small storage, the time period may be produced by a first-in, last-out storage device. The storage device by its cycle and length or a number of stored time periods define the time period of delay.

Figure 4:
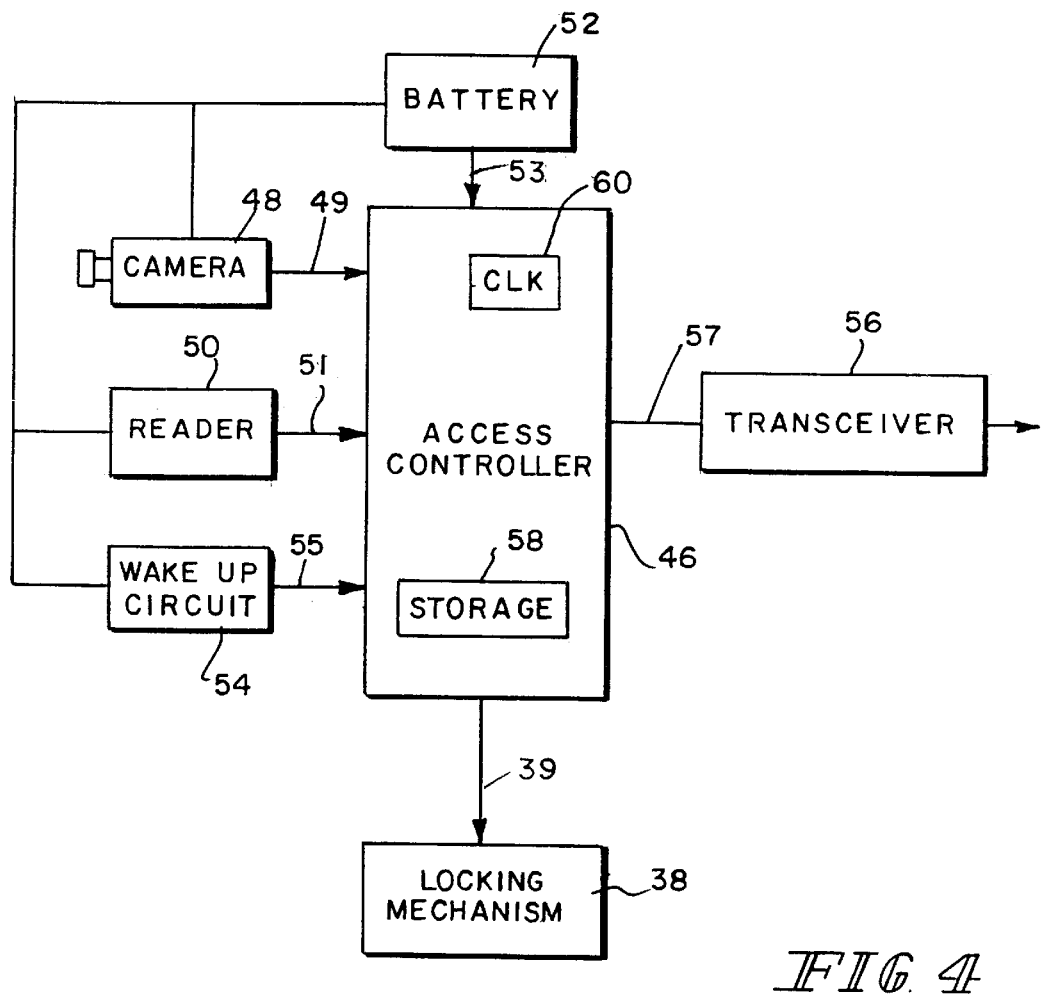
FIG. 4 is a block diagram of another embodiment of an integrated access system according to the principles of the present invention.

A block diagram of the integrated access'system 30 is illustrated in FIG. 4 as including an access controller 46 connected to a camera 48 by wire 49, to sensor or reader 50 by wire 51, to a power source 52 by wire 53 and to the locking mechanism 38 by wire 39. The power source 52 can be an external power source or may be batteries. If batteries, it is preferred that a wake up circuit 54 be provided to control the connection of the power to the access controller 46 and possibly the reader 50. A description of such a system without the camera 40 is described in a copending application titled "Proximity Card Detection System", Ser. No. 09/243,772 filed Sep. 23, 1999. This application is incorporated herein by reference.

The reader 50 can be adapted for magnetic strips, proximity card, smart card, touch memory, biometric, which includes hand print, eye, facial recognition, facial blood flow and voice. The reader sensor 50 and the lock mechanism 38 correspond to those elements represented by numeral 14 in FIG. 1.

Also provided as part of the integrated access system 30 is a transceiver 56 connected to the access controller 46 by wire 57. The transceiver 56 communicates information collected by the access controller 46. This will include identity of the access device 28, the time and date from clock 60 and images captured from camera 48 from storage 58. The transceiver 56 transmits this information to the centrally located management system 18. The access controller 46 correlates the images captured by camera 48 with the input data based on a time delay. This time delay may be a specific time delay or may be produced by the storage device 58. The storage device may be a first-in, last-out memory. The time delay will be defined by the number of images stored and the sampling time or cycle.

Figure 5:
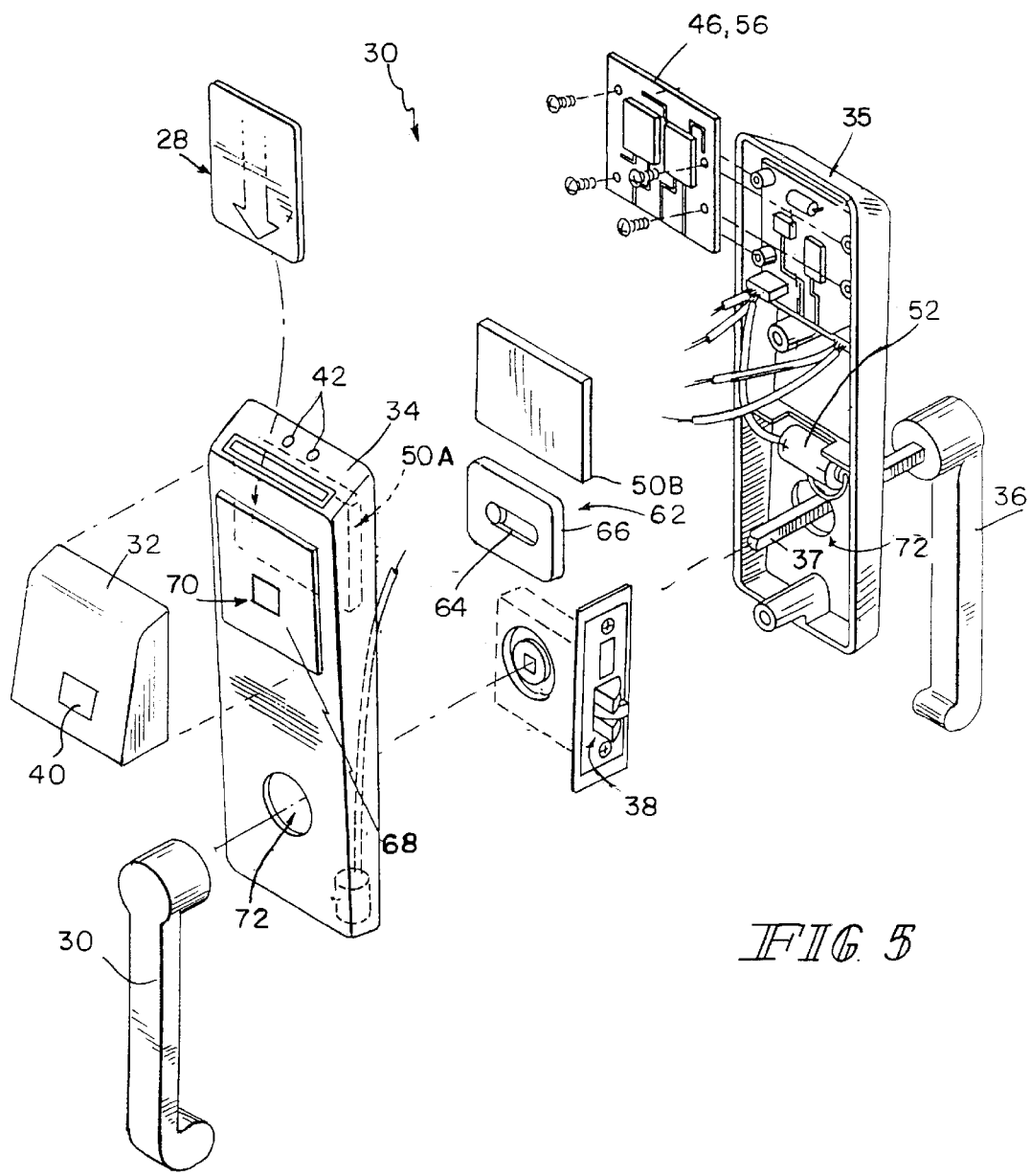
FIG. 5 is an exploded view of an integrated access device according to the principles of the present invention.

An exploded view of the integrated access system 30 without wires is illustrated in FIG. 5. The front housing 34 includes the reader 50 illustrated as electronic or PC board 50A and a sensor 50B. The sensor 50B may be an inductive loop for reading information from a card. Alternatively, this is an optical reader and would also be provided behind the bezel 32 and/or behind the access plate 68. At least a sensor part of a wake up circuit, not shown, but may also be included behind the bezel 32.

Also mounted in the front housing 34 is the video device 62 illustrated as a lens 64 mounted on a PC board 66. The video device 62 can, for example, be a CMOS camera, V-XA095 from Marshall Electronics. Such a device has automatic exposure and white balance. The front housing 34 includes an access panel 68 with an opening 70 for the camera. This aligns with the aperture 40 on the bezel 32. Preferably, the bezel 32 is all of the same material so as not to indicate whether there is a camera behind the aperture 40. Thus, the bezel 34 should all be made out of the smoked material or a one-way mirror.

The handle 36 includes a spindle 37 extending through a pair of aligned apertures 72 in the housing portions 34 and 35. This spindle 37 is received in an opening in the locked mechanism 38.

The access controller 46 and transceiver 56 may be provided in the rear housing 35 or remote from the door 26. The power supply or battery 52 may also be provided in the rear housing 35.

Figure 6:
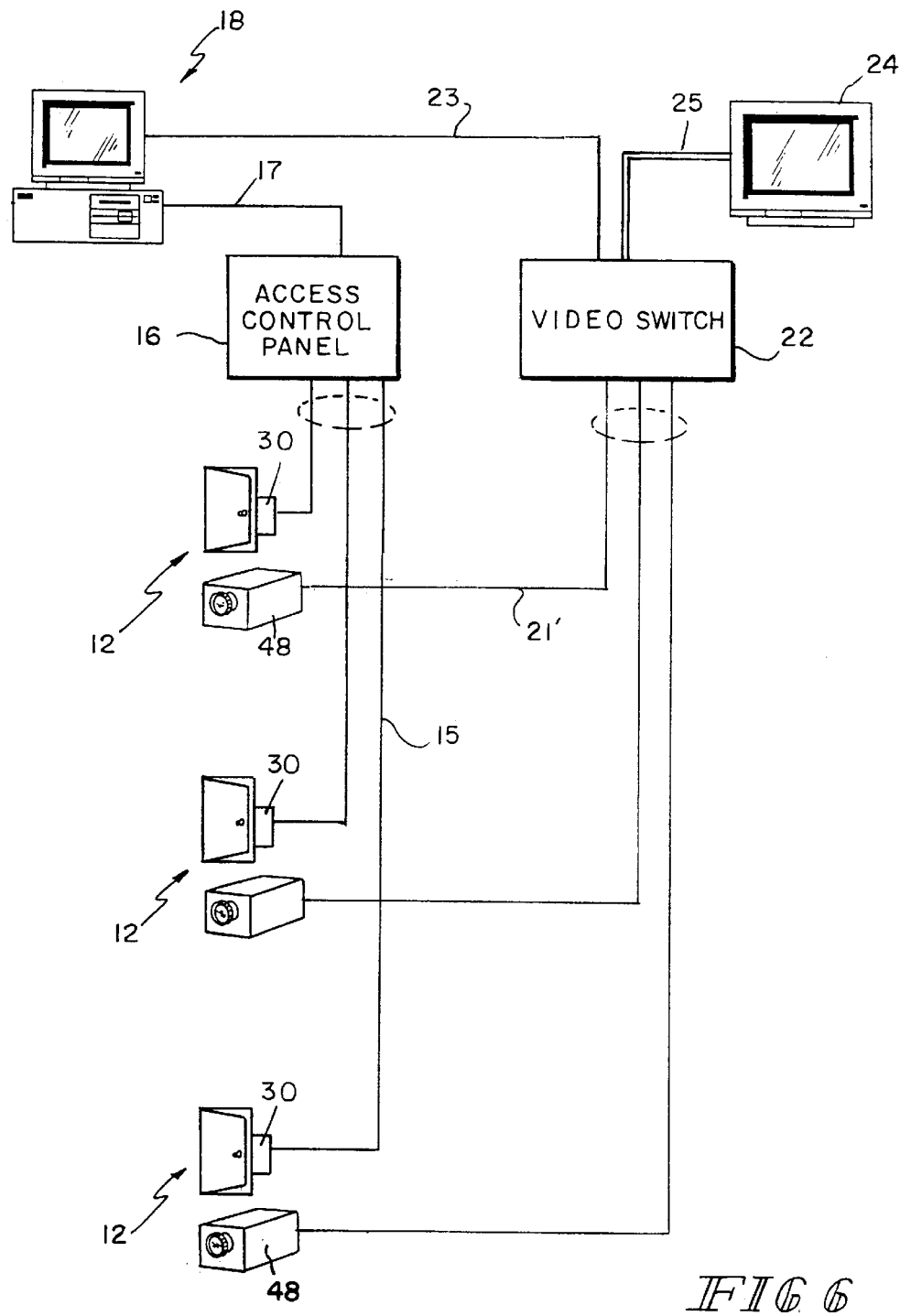
FIG. 6 is a block diagram of a first embodiment of a security control system according to the principles of the present invention.
Figure 7:
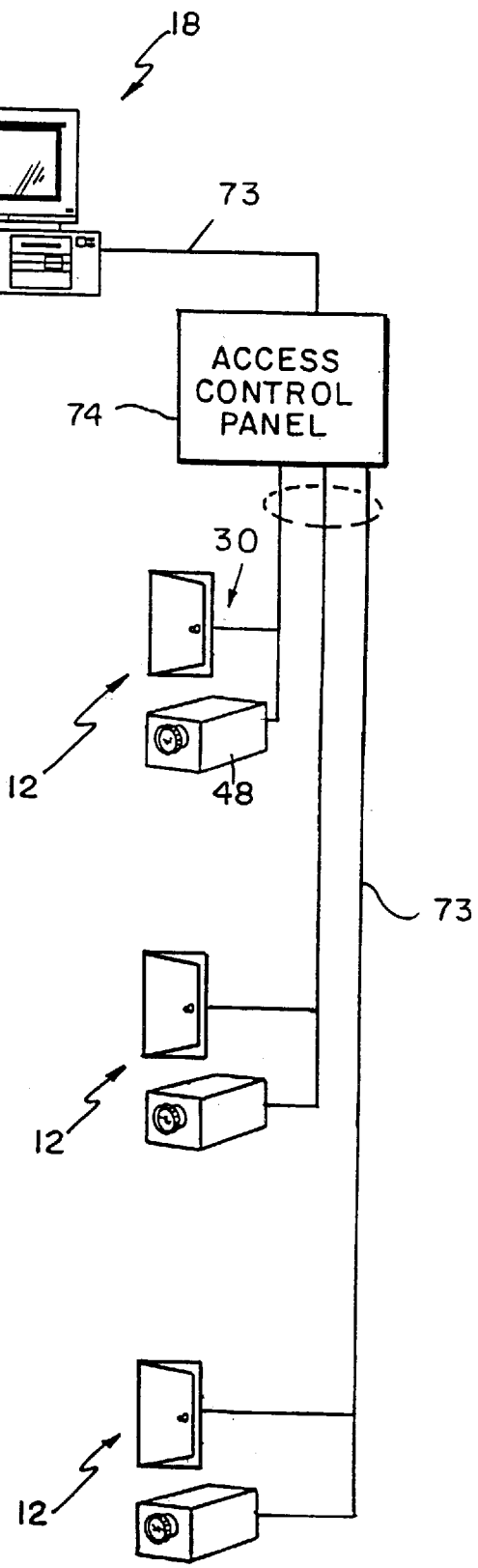
FIG. 7 is a block diagram of a second embodiment of a security control system according to the principles of the present invention.

The integrated access system 30 of the present invention may be connected to the management system 18 through the same system as illustrated in FIG. 1 and shown in FIG. 6 or by a modified system as shown in FIG. 7. The cameras 48 are connected by wires 21' to the video switch 22 and by line 23 to the management 18. Preferably, the connection 21' is a twisted pair, for example, telephone lines instead of the coaxial cable of the prior art of FIG. 1. A video transceiver, for example, model NV-213A from NVT could be used. The remainder of the integrated access system 30 is connected by wire 15, access control panel 16 and wire 17 to the management system 18. The access control panel 16 would include the access controller 46 and a transceiver 56.

As illustrated in FIG. 7, the information from the integrated access system 30 may be transmitted over a single pair of twisted wires 73 through access control panel and video switch 74 and wire 73 to the management system 18. The information or data may be digitized for transmission over the twisted pair 73.

As discussed previously, the combined access control panel and video switch 74 may be provided as illustrated in FIG. 7 at each of the passage ways. Although the integrated system 30 has been shown as mounted to a door 26 in FIG. 2, it may be mounted adjacent the passage way to include a sensor/reader and video device in a common housing. The lock mechanism 38 may be displaced from these elements. The access controller 46 and related circuits can be located anywhere.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. An access system comprising:
   a sensor generating a sensor signal in response to a presentation of an access device by a presenter to the sensor;
   a video device capturing a series of images of the presenter immediately prior to the presentation;
   a storage device operatively coupled to the video device, the storage device storing the series of images of the presenter;
   a controller coupled to the sensor, the controller generating a control signal responsive to the sensor signal; and
   a locking mechanism coupled to the controller responsive to the control signal;
   wherein an identifying data is generated from the sensor signal, and wherein said identifying data is correlated to one or more of the images in the storage device.

2. The system according to claim 1 wherein the data is generated and correlated to at least one image by the controller.

3. The system according to claim 1 wherein the data is generated and correlated to at least one image by a remote computer.

4. The system according to claim 1 wherein the data includes information identifying the access device.

5. The system according to claim 4 wherein the data includes information identifying a time at which the access device is presented.

6. The system according to claim 1 wherein the video device captures the images periodically, such that one image is captured every first period of time, and wherein the storage device stores images for a second period of time.

7. The system according to claim 6 wherein the data includes information identifying the access device, and the data is correlated to the images such that at least one image is captured between a first predetermined time before the presentation of the access device and a second predetermined time before the presentation of the access device is associated with the information identifying the access device.

8. The system according to claim 1 wherein the storage device is proximately located to the video device.

9. The system according to claim 1 wherein the storage device is remotely located from the video device.

10. The system according to claim 1 further including a housing containing the video device, wherein the housing includes a translucent panel and the video device is behind the translucent panel.

11. The system according to claim 10 wherein the translucent panel is smoked.

12. The system according to claim 10 wherein the video device includes a wide angle lens.

13. The system according to claim 1 further including a housing containing the video device, wherein the housing includes a one way mirror and the video device is behind the one way mirror.

14. The system according to claim 1 further including a housing having an escutcheon of the locking mechanism and a handle of the locking mechanism, the handle extending through the escutcheon, and the controller is in the housing.

15. The system according to claim 1 further including a transmitter configured to transmit the data and at least one image to a remote location.

16. An access system comprising:
   a sensor generating a sensor signal in response to a presentation of an access device to the sensor by a presenter;
   a video device periodically capturing a series of images of the presenter of the access device immediately prior to the presentation, such that one image of the series is captured every first period of time;
   a storage device operatively coupled to the video device, the storage device storing each image of the series of images for a second period of time prior to the presentation of the access device;
   a controller coupled to the sensor, the controller generating a control signal responsive to the sensor signal; and
   a locking mechanism coupled to the controller responsive to the control signal;
   wherein data identifying the access device is generated from the sensor signal, and wherein the data is correlated to one or more of the images in the storage device.

17. The system according to claim 16 further including a transmitter coupled to the storage device, the transmitter transmitting one or more of the images stored in the storage device to a remote location.

18. The system according to claim 17 wherein the remote location includes a second memory, and the images transmitted t o the remote location are stored in the second memory.

19. The system according to claim 18 wherein the transmitter further transmits the data to the remote location, and the data transmitted to the remote location is stored in the second memory.

20. The system according to claim 16 wherein the data further includes data identifying a time at which the access device is presented.

21. The system according to claim 16 further including a housing containing the video device, wherein the housing includes a translucent panel and the video device is behind the translucent panel.

22. The system according to claim 21 wherein the translucent panel is smoked.

23. The system according to claim 21 wherein the video device includes a wide angle lens.

24. The system according to claim 16 further including a housing containing the video device, wherein the housing includes a one way mirror and the video device is behind the one way mirror.

25. The system according to claim 16 wherein the housing includes an escutcheon of the locking mechanism and a handle of the locking mechanism extends through the escutcheon, and the controller is in the housing.

26. A method for monitoring access to a portal, the method comprising:

capturing periodically a series of images of a presenter of an access device immediately prior to an attempted access to the portal;

storing the images sequentially, such that each image is stored for a first period of time;

generating a signal in response to the attempt to access the portal by the presenter;

permitting access to the portal if the signal indicates the attempt is valid;

correlating identifying data contained in the signal with at least one of the stored images; and transmitting, to a remote computer, the at least one stored image and the data correlated therewith in response to the signal.

27. The method of claim 26 wherein the capturing step includes capturing an image approximately every second period of time using a video device and the second period time is less than the first period of time.

28. The method of claim 27 wherein the storing step includes using a memory operatively coupled to the video device to store the images.

29. The method of claim 28 wherein the generating step includes using a sensor responsive to the attempt to generate the signal.

30. The method of claim 29 wherein the sensor generates the signal in response to sensing a token.

31. The method of claim 29 wherein the sensor comprises a keypad containing keys, the keypad generating the signal in response to actuation of keys.

32. The method of claim 26 wherein the permitting step includes activating a locking mechanism operatively coupled to the sensor in response to the signal.

33. The method of claim 32 wherein the permitting step further includes using a controller operatively coupled between the sensor and the locking mechanism to determine whether the attempt is valid.

34. The method of claim 28 wherein the correlating step further includes using a controller operatively coupled to the sensor and to the memory.

35. The method of claim 30 wherein the correlating step further includes deriving data identifying the token from the signal, and correlating the data identifying the access device with at least one stored image.

36. The method of claim 30 wherein the correlating step further includes deriving from the signal data identifying a time at which the token is presented, and correlating the data identifying the time of presentation with at least one stored image.

* * * * *